(12) United States Patent
Barberger et al.

(10) Patent No.: US 12,163,462 B1
(45) Date of Patent: Dec. 10, 2024

(54) INTERNAL COMBUSTION ENGINE WITH MONOLITHIC PILOT CHAMBER STRUCTURE

(71) Applicant: Pratt & Whitney Canada Corp., Longueuil (CA)

(72) Inventors: Jeremie Barberger, Montreal (CA); Vincent Savaria, Laval (CA); Alice Goffin, Montreal (CA); Josianne Coulombe, Boucherville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/242,334

(22) Filed: Sep. 5, 2023

(51) Int. Cl.
*F02B 53/10* (2006.01)
*F02B 53/12* (2006.01)
*F02B 55/14* (2006.01)

(52) U.S. Cl.
CPC .............. *F02B 53/10* (2013.01); *F02B 53/12* (2013.01); *F02B 55/14* (2013.01)

(58) Field of Classification Search
CPC ........... F02B 53/10; F02B 53/12; F02B 55/14
See application file for complete search history.

(56) References Cited

U.S. PATENT DOCUMENTS

| | | | |
|---|---|---|---|
| 4,522,171 A * | 6/1985 | Dworak | F02B 19/165 123/270 |
| 4,662,331 A | 5/1987 | Ogawa | |
| 5,715,787 A | 2/1998 | Kawamura | |
| 5,915,351 A | 6/1999 | Regueiro | |
| 9,038,594 B2 | 5/2015 | Thomassin | |
| 10,041,402 B2 | 8/2018 | Schulz | |
| 10,208,652 B2 | 2/2019 | Maier | |
| 10,226,818 B2 | 3/2019 | Scalzo | |
| 10,343,214 B2 | 7/2019 | Natarajan | |
| 10,557,407 B2 * | 2/2020 | Dussault | F01C 1/22 |
| 10,815,877 B2 * | 10/2020 | Julien | F02B 19/10 |
| 11,111,848 B1 * | 9/2021 | Bergeron | F02B 55/08 |
| 11,686,242 B2 | 6/2023 | Mclaughlin | |

FOREIGN PATENT DOCUMENTS

| | | | |
|---|---|---|---|
| EP | 3620628 A1 | 3/2020 | |
| JP | 61093227 | 5/1986 | |
| JP | 61093227 A * | 5/1986 | ............ F02B 19/165 |

* cited by examiner

*Primary Examiner* — Audrey B. Walter
(74) *Attorney, Agent, or Firm* — Getz Balich LLC (57) ABSTRACT

An apparatus is provided for a powerplant. This apparatus includes a pilot chamber structure formed as a monolithic body. The pilot chamber structure includes an exterior surface, an interior surface, a pilot chamber, a pilot aperture, a fuel aperture and an ignitor aperture. A material property of the monolithic body may change as the pilot chamber structure extends between the exterior surface and the interior surface. The interior surface forms an outer peripheral boundary of the pilot chamber. The pilot chamber is internal to the pilot chamber structure. The pilot aperture projects into the pilot chamber structure to the pilot chamber. The fuel aperture projects into the pilot chamber structure to the pilot chamber. The ignitor aperture projects into the pilot chamber structure to the pilot chamber.

18 Claims, 9 Drawing Sheets

INTERNAL COMBUSTION ENGINE WITH MONOLITHIC PILOT CHAMBER STRUCTURE

TECHNICAL FIELD

This disclosure relates generally to an internal combustion engine and, more particularly, to an ignition system for the engine.

BACKGROUND INFORMATION

An internal combustion engine includes an ignition system for igniting a fuel-air mixture for combustion. Various types and configurations of ignition systems are known in the art. While these known ignition systems have various benefits, there is still room in the art for improvement.

SUMMARY

According to an aspect of the present disclosure, an apparatus is provided for a powerplant. This apparatus includes a pilot chamber structure formed as a monolithic body. The pilot chamber structure includes an exterior surface, an interior surface, a pilot chamber, a pilot aperture, a fuel aperture and an ignitor aperture. A material property of the monolithic body changes as the pilot chamber structure extends between the exterior surface and the interior surface. The interior surface forms an outer peripheral boundary of the pilot chamber. The pilot chamber is internal to the pilot chamber structure. The pilot aperture projects into the pilot chamber structure to the pilot chamber. The fuel aperture projects into the pilot chamber structure to the pilot chamber. The ignitor aperture projects into the pilot chamber structure to the pilot chamber.

According to another aspect of the present disclosure, another apparatus is provided for a powerplant. This apparatus includes a pilot chamber structure formed as a monolithic body. The pilot chamber structure includes an exterior surface, an interior surface, a pilot chamber, a pilot aperture, a fuel aperture and an ignitor aperture. The interior surface forms an outer peripheral boundary of the pilot chamber. A surface texture of the interior surface is different than a surface texture of the exterior surface. The pilot chamber is internal to the pilot chamber structure. The pilot aperture projects into the pilot chamber structure to the pilot chamber. The fuel aperture projects into the pilot chamber structure to the pilot chamber. The ignitor aperture projects into the pilot chamber structure to the pilot chamber.

According to still another aspect of the present disclosure, a method of manufacture is provided during which a pilot chamber structure is formed as a monolithic body. The forming of the pilot chamber structure includes: forming a green structure using powder injection molding; debinding the green structure to form a monolithic brown structure; and sintering the monolithic brown structure. The pilot chamber structure includes a pilot chamber, a pilot aperture, a fuel aperture and an ignitor aperture. The pilot chamber is internal to the pilot chamber structure. The pilot aperture projects into the pilot chamber structure to the pilot chamber. The fuel aperture projects into the pilot chamber structure to the pilot chamber. The ignitor aperture projects into the pilot chamber structure to the pilot chamber.

The green structure may be configured as or otherwise include a monolithic green body configured as a preform of the pilot chamber structure.

The method may also include removing a soluble core from a preform pilot chamber within the monolithic green body. The preform pilot chamber may be formed in the green structure during the powder injection molding using the soluble core.

The green structure may include a first green part and a second green part. The debinding of the green structure may include co-debinding the first green part with the second green part to form the monolithic brown structure.

The material property may be a density of the monolithic body.

An interior portion of the monolithic body at least partially forming the interior surface may have a higher density than an exterior portion of the monolithic body at least partially forming the exterior surface.

An interior portion of the monolithic body at least partially forming the interior surface may have a lower density than an exterior portion of the monolithic body at least partially forming the exterior surface.

The material property may be a material composition of the monolithic body.

An interior portion of the monolithic body at least partially forming the interior surface may be configured from or otherwise include a first material. An exterior portion of the monolithic body at least partially forming the exterior surface may be configured from or otherwise include a second material which is different than the first material.

An intermediate portion of the monolithic body between the interior portion of the monolithic body and the exterior portion of the monolithic body may be configured from or otherwise include the first material and the second material.

A surface texture of the interior surface may be different than a surface texture of the exterior surface.

A channel may project into the pilot chamber structure from the interior surface.

The pilot chamber structure may also include an internal cavity between the interior surface and the exterior surface. The internal cavity may extend circumferentially about the pilot chamber.

At least a portion of the interior surface may have a uniform radius of curvature.

At least a portion of the interior surface may have a non-uniform radius of curvature.

The monolithic body may be configured from or otherwise include a ceramic.

The monolithic body may be configured from or otherwise include a metal.

The apparatus may also include a housing, a primary fuel injector and an ignition system. The housing may form a combustion volume within the housing. The primary fuel injector may be configured to inject primary fuel into the combustion volume. The ignition system may be configured to ignite the primary fuel within the combustion volume. The ignition system may include a pilot fuel injector, a pilot ignitor and the pilot chamber structure. The pilot fuel injector may be mated with the fuel aperture and configured to inject pilot fuel into the pilot chamber. The pilot ignitor may be mated with the ignitor aperture and configured to ignite the pilot fuel within the pilot chamber. The pilot chamber may be fluidly coupled with the combustion volume through the pilot aperture.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
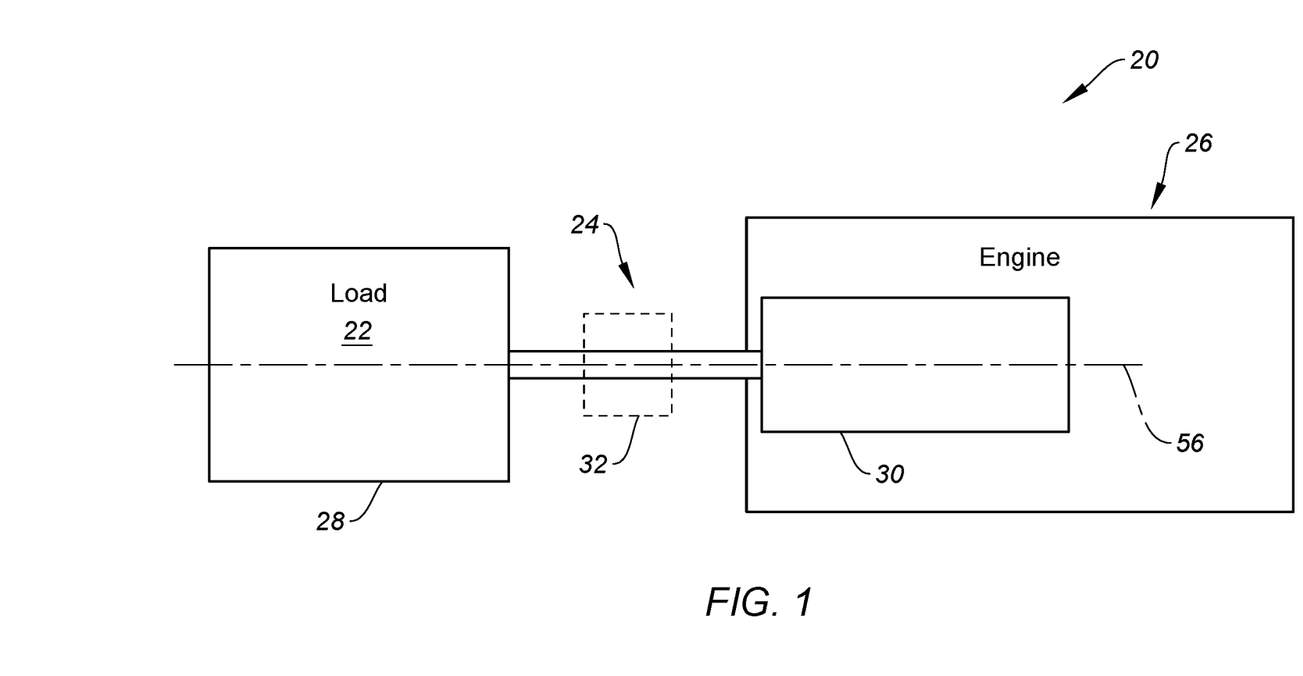
FIG. 1 is a schematic illustration of a powerplant.

FIG. 1 is a schematic illustration of a powerplant 20. This powerplant 20 may be configured for an aircraft. The aircraft may be an airplane, a rotorcraft, a drone (e.g., an unmanned aerial vehicle (UAV)) or any other manned or unmanned aerial vehicle and/or system. Alternatively, the powerplant 20 be configured for a land vehicle, a water vehicle, a stationary application such as a ground-based electrical power generator, or various other mobile and/or stationary applications. However, for ease of description, the powerplant 20 may be generally described below as an aircraft powerplant. The aircraft powerplant 20 of FIG. 1 includes a mechanical load 22, a drivetrain 24 and an internal combustion (IC) engine 26, where the drivetrain 24 mechanically couples the mechanical load 22 to the IC engine 26.

The mechanical load 22 may be configured as or otherwise include a rotor 28 mechanically driven by the IC engine 26 through the drivetrain 24. This driven rotor 28 may be a bladed propulsor rotor where the aircraft powerplant 20 is configured as or otherwise includes a propulsion system for the aircraft. The propulsor rotor may be an open (e.g., un-ducted) propulsor rotor or a ducted propulsor rotor. Examples of the open propulsor rotor include a propeller rotor for a turboprop propulsion system, a rotorcraft rotor (e.g., a main helicopter rotor) for a turboshaft propulsion system, a propfan rotor for a propfan propulsion system, and a pusher fan rotor for a pusher fan propulsion system. An example of the ducted propulsor rotor is a fan rotor for a ducted fan propulsion system. The present disclosure, of course, is not limited to the foregoing exemplary propulsor rotor arrangements. Moreover, the driven rotor 28 may alternatively be a generator rotor of an electric power generator where the aircraft powerplant 20 is (or is part of) an electrical power system for the aircraft; e.g., an auxiliary power unit (APU) for the aircraft.

The drivetrain 24 may be configured as a direct-drive drivetrain. With such a configuration, the driven rotor 28 is operable to rotate at a common (the same) rotational speed as an engine rotating structure 30 of the IC engine 26. Alternatively, the drivetrain 24 may be configured as a geared drivetrain. With such a configuration, the drive rotor is operable to rotate at a different (e.g., faster or slower) rotational speed than the engine rotating structure 30. The drivetrain 24, for example, may include a geartrain 32 (e.g., an epicyclic gear system) and/or another transmission device coupled between the driven rotor 28 and the engine rotating structure 30.

The IC engine 26 may be configured as a rotary engine such as, but not limited to, a Wankel engine. The IC engine 26 of FIG. 2, for example, includes an engine housing 34, an engine rotor 36, a primary fuel injector 38 and an ignition system 40.

Figure 2:
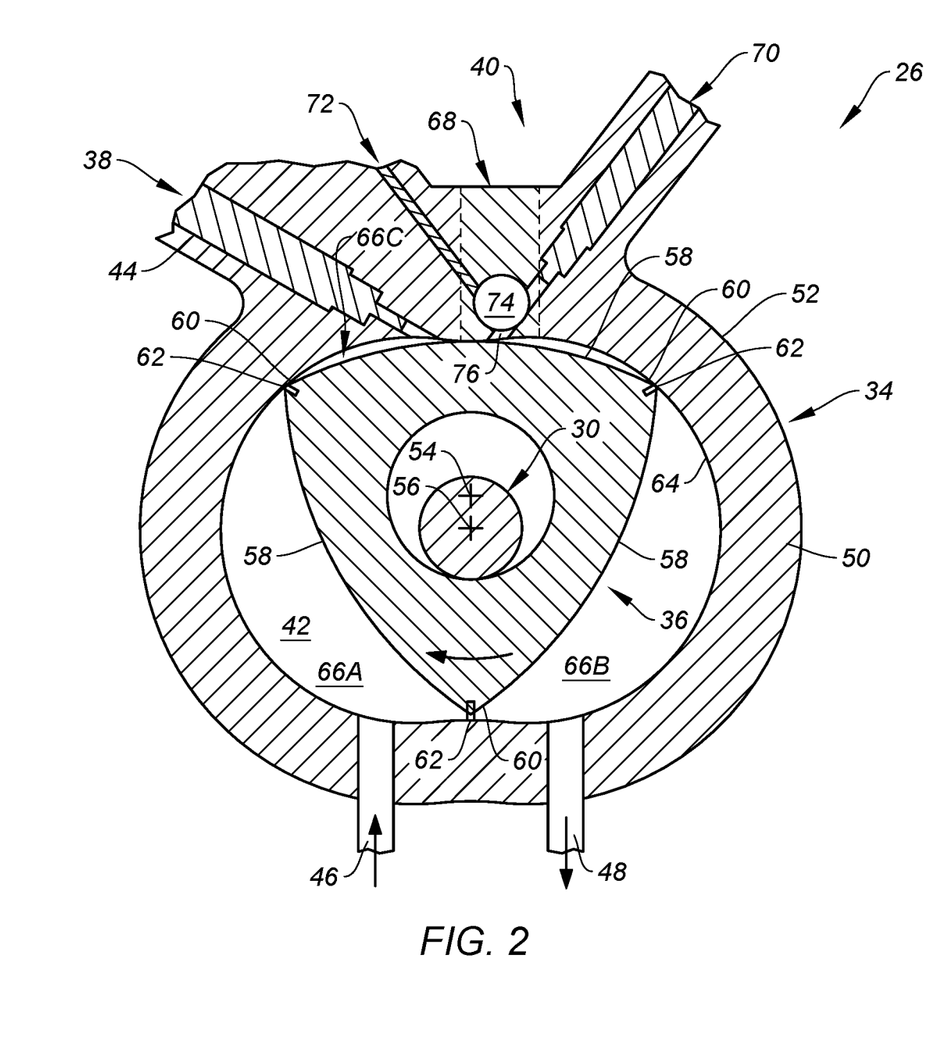
FIG. 2 is a sectional schematic illustration of an internal combustion engine.

The engine housing 34 of FIG. 2 includes an internal housing cavity 42, a primary fuel injector receptacle 44, an air intake passage 46 and a combustion products exhaust passage 48. The engine housing 34 is also configured for mating with the ignition system 40 as described below in further detail. The housing cavity 42 is formed within and enclosed by the engine housing 34. The primary fuel injector receptacle 44 extends through a peripheral wall 50 of the engine housing 34 from an exterior 52 of the engine housing 34 to the housing cavity 42. The intake passage 46 extends from an inlet into the IC engine 26, through the housing peripheral wall 50, to the housing cavity 42, which engine inlet may also be an inlet to the aircraft powerplant 20 (see FIG. 1). The exhaust passage 48 extend from the housing cavity 42, through the housing peripheral wall 50, to an exhaust from the IC engine 26, which engine exhaust may also be an exhaust from the aircraft powerplant 20 (see FIG. 1).

The engine rotor 36 of FIG. 2 is disposed within the housing cavity 42, where the housing peripheral wall 50 extends circumferentially around an outer periphery of the engine rotor 36. The engine rotor 36 is coupled to and rotatable with the engine rotating structure 30. However, the engine rotor 36 of FIG. 2 is eccentric to the engine rotating structure 30. A centerline 54 of the engine rotor 36, for example, is parallel with, but offset from, a centerline 56 of the engine rotating structure 30, where the rotor centerline 54 is also a rotational axis of the engine rotor 36 and/or where the rotating structure centerline 56 is also a rotational axis of the engine rotating structure 30. With this arrangement, as the engine rotor 36 rotates about its rotor centerline 54, the rotor centerline 54 moves (e.g., circles) about the rotating structure centerline 56. Here, a timing gear may be provided to control a rotational velocity of the engine rotor 36 to be slower than (e.g., ⅓ of) a rotational velocity of the engine rotating structure 30.

The engine rotor 36 may have a non-circular, lobed cross-sectional geometry when viewed, for example, in a reference plane perpendicular to the rotor centerline 54. The engine rotor 36 of FIG. 2, for example, includes a plurality of (e.g., arcuate, convex) peripheral rotor faces 58 arranged circumferentially about the rotor centerline 54. Each circumferentially neighboring (e.g., adjacent) pair of the rotor faces 58 meets at a respective apex 60 of the engine rotor 36. The engine rotor 36 may also include one or more rotor seals 62, where each rotor seal 62 is arranged at (e.g., on, adjacent or proximate) a respective one of the rotor apexes 60. Each rotor seal 62 is configured to sealingly engage (e.g., contact) and thereby form a seal interface with an interior 64 of the housing peripheral wall 50. Of course, the engine rotor 36 may be configured with various other seal elements which are omitted from the drawings for clarity. Examples of these other seal elements include, but are not limited to, gas seal element(s) and/or oil seal element(s) arranged with side faces of the engine rotor 36.

The engine rotor 36 and the engine housing 34 may collectively form one or more combustion volumes 66A-C (generally referred to as "66") (e.g., combustion chambers, working volumes, etc.) within the engine housing 34. Each combustion volume 66, in particular, is formed by and between a respective one of the rotor faces 58 and a corresponding (albeit changing) portion of the housing peripheral wall 50, and circumferentially between a respective neighboring pair of the rotor seals 62. Each of the combustion volumes 66 moves about the centerline 54, 56 as the engine rotor 36 eccentrically rotates within the engine housing 34 and its housing cavity 42. With the rotor position of FIG. 2, the combustion volume 66A is fluidly coupled with the intake passage 46 (and fluidly decoupled from the exhaust passage 48), the combustion volume 66B is fluidly coupled with the exhaust passage 48 (and fluidly decoupled from the intake passage 46), and the combustion volume 66C is fluidly decoupled from the intake passage 46 and the exhaust passage 48.

The primary fuel injector 38 is mated with/received within the primary fuel injector receptacle 44. The primary fuel injector 38, for example, projects into the primary fuel injector receptacle 44 and is threaded into or otherwise attached to the engine housing 34.

During engine operation, air is directed through the intake passage 46 into a respective one of the combustion volumes 66. As the engine rotor 36 rotates within the engine housing 34, a volumetric measure of the respective combustion volume 66 decreases thereby compressing the air within that combustion volume 66. The primary fuel injector 38 directs (e.g., injects) primary fuel into the respective combustion volume 66 to mix with the air as it is being compressed to provide a fuel-air mixture. When the respective combustion volume 66 aligns with the ignition system 40, the fuel-air mixture within that combustion volume 66 is ignited to generate combustion products. As the engine rotor 36 continues to rotate within the engine housing 34, the volumetric measure of the respective combustion volume 66 increases thereby facilitating expansion of the combustion products within the respective combustion volume 66 until those expanded combustion products are exhausted from the IC engine 26 through the exhaust passage 48. Internal combustion pressure loads of the combustion products within the respective combustion volume 66 drives rotation of the engine rotor 36 within the engine housing 34. The rotation of the engine rotor 36 and, thus, the rotation of the engine rotating structure 30 in turn drives rotation of the driven rotor 28 of FIG. 1 through the drivetrain 24.

Referring to FIG. 2, to ignite the fuel-air mixture within one of the combustion volumes 66, the ignition system 40 is configured to introduce a flame (e.g., a pilot flame) and/or relatively hot combustion products into the respective combustion volume 66. The ignition system 40 of FIG. 2, for example, includes a pilot chamber structure 68 (schematically shown), a pilot fuel injector 70 ("pilot injector") and a pilot ignitor 72 (e.g., a spark plug, a glow plug, etc.). The pilot chamber structure 68 includes an internal pilot chamber 74 (e.g., a sub-chamber, a pre-ignition chamber, etc.) and a pilot aperture 76 (e.g., a transfer hole) which fluidly couples the pilot chamber 74 to the respective combustion volume 66. The pilot injector 70 is configured to direct (e.g., inject) pilot fuel into the pilot chamber 74. The pilot ignitor 72 is configured to ignite the pilot fuel within the pilot chamber 74 to generate the pilot flame and/or the pilot combustion products. The pilot flame and/or the pilot combustion products are directed through the pilot aperture 76 into the respective combustion volume (e.g., 66C) to ignite the fuel-air mixture within that combustion volume (e.g., 66C).

Figure 3:
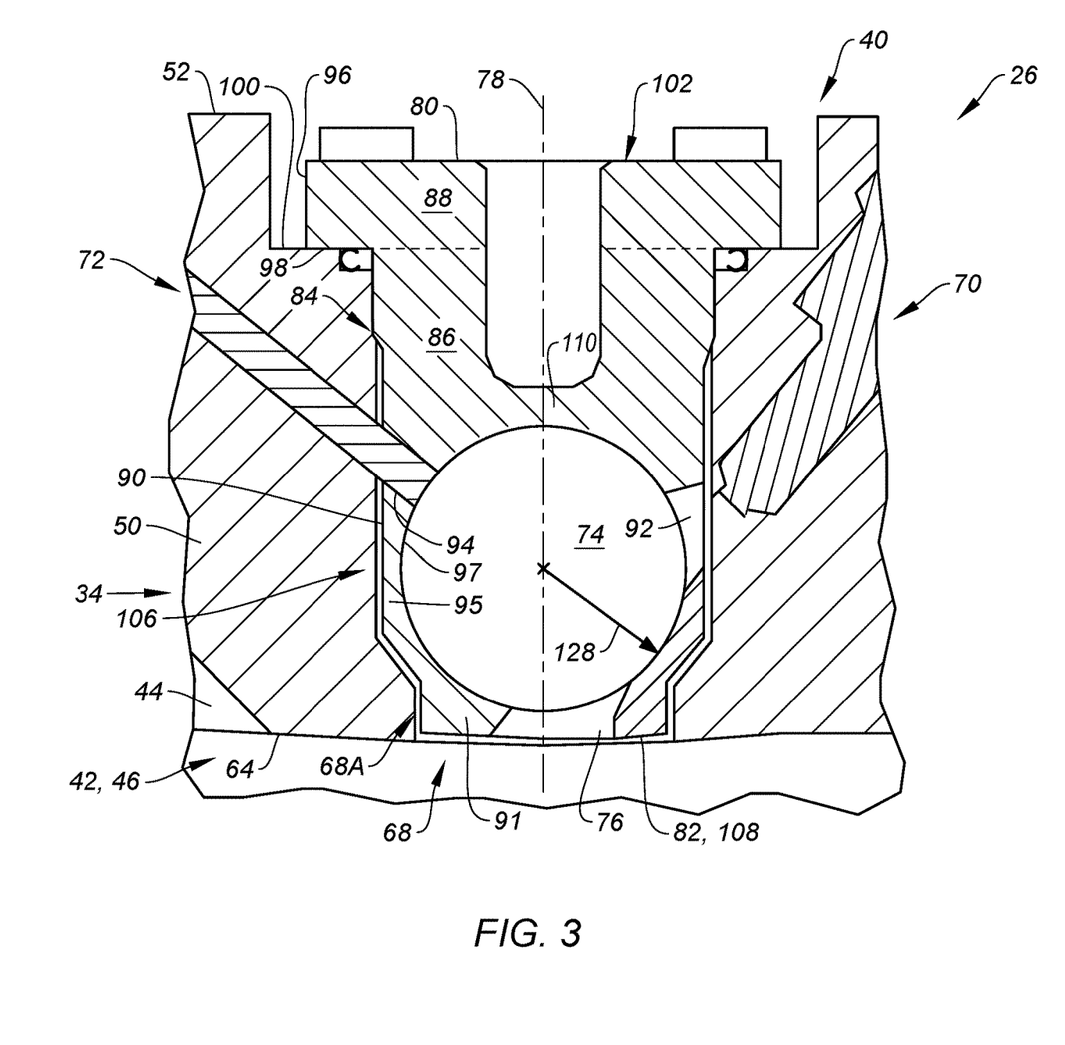
FIG. 3 is a partial sectional illustration of the engine about a pilot chamber structure.

Referring to FIG. 3, the pilot chamber structure 68 extends longitudinally (e.g., radially relative to the axes 54, 56 of FIG. 2) along a longitudinal centerline 78 of the pilot chamber structure 68 between and to an outer end 80 of the pilot chamber structure 68 and an inner end 82 of the pilot chamber structure 68. The pilot chamber structure 68 may be formed as a plug with a T-shaped sectional geometry. The pilot chamber structure 68 may thereby be inserted into (e.g., plugged into) or otherwise mated with a pilot chamber structure receptacle 84 in the engine housing 34. Briefly, this pilot chamber structure receptacle 84 of FIG. 3 projects (e.g., longitudinally along the structure centerline 78) into the engine housing 34, through the housing peripheral wall 50, from the exterior 52 of the engine housing 34 to the housing cavity 42 and a respective one of its combustion volumes 66. The pilot chamber structure 68 of FIG. 3 includes a pilot chamber structure base 86 and a pilot chamber structure mount 88.

The structure base 86 is disposed at the structure inner end 82. The structure base 86 of FIG. 3, for example, projects longitudinally along the structure centerline 78 out from the structure mount 88 to the structure inner end 82. The structure base 86 projects laterally (e.g., radially relative to the structure centerline 78) out to an exterior surface 90 of the structure base 86. The pilot chamber 74 is formed within the structure base 86. The pilot chamber 74 of FIG. 3 has a spherical geometry which may facilitate provision of a relatively compact and durable pilot chamber structure. The present disclosure, however, is not limited to such an exemplary pilot chamber geometry. The pilot chamber 74, for example, may alternatively have a cylindrical geometry, a frustoconical geometry, a teardrop-shaped geometry, etc. Referring again to FIG. 3, the pilot aperture 76 projects into the structure base 86, through an inner endwall 91 of the pilot chamber structure 68 and its structure base 86, from the structure inner end 82 to the pilot chamber 74. A centerline of the pilot aperture 76 may be angularly offset from the structure centerline 78 by a non-zero acute angle. The present disclosure, however, is not limited to such an exemplary angularly offset pilot aperture arrangement.

The pilot chamber structure 68 and its structure base 86 of FIG. 3 also include a fuel aperture 92 and at least one ignitor aperture 94. The fuel aperture 92 and the ignitor aperture 94 each project laterally into the structure base 86, through an annular sidewall 95 of the pilot chamber structure 68 and its structure base 86, from the base exterior surface 90 to an interior surface 97 of the structure base 86, which base internal surface 97 (e.g., completely) forms an outer peripheral boundary of the pilot chamber 74 within the pilot chamber structure 68. The fuel aperture 92 and the ignitor aperture 94 of FIG. 3 are arranged to opposing lateral sides of the pilot chamber 74. The present disclosure, however, is not limited to such an exemplary arrangement.

The structure mount 88 is disposed at the structure outer end 80. The structure mount 88 of FIG. 3, for example, projects longitudinally along the structure centerline 78 out from the structure base 86 to the structure outer end 80. The structure mount 88 also projects laterally out from the structure base 86 and its base exterior surface 90 to a (e.g., annular) lateral distal end 96 of the structure mount 88. With this arrangement, the structure mount 88 forms a (e.g., annular) shelf 98 (e.g., an axial seal face) which projects laterally inward from the mount distal end 96 towards the base exterior surface 90. This shelf 98 may be abutted against or otherwise engaged with a (e.g., annular) shelf 100 of the engine housing 34 along the pilot chamber structure receptacle 84.

The pilot chamber structure 68 of FIG. 3 is configured as a monolithic body 102. This monolithic body 102 may be constructed from a continuous mass of material; e.g., a single material or a combination of multiple materials. The pilot chamber structure 68, for example, may be additively manufactured, powder injection molded (PIM) and/or otherwise formed as a single, unitary body, examples of which are described below in further detail. By contrast, a non-monolithic body may be formed from a plurality of discretely formed bodies, which bodies are joined (e.g., mechanically, welded, etc.) together subsequent to (e.g., complete) formation thereof to form a multi-segment structure. With the monolithic configuration of FIG. 3, the base interior surface 97 may be substantially or completely uninterrupted; e.g., besides respective openings to pilot aperture 76, the fuel aperture 92 and the ignitor aperture 94. By contrast, where a pilot chamber structure is formed as a multi-segment structure (e.g., a structure formed by welding two conventionally machined metal parts together at a mid-plane of an internal pilot chamber), a seam line may interrupt an interior surface forming its pilot chamber. Such a seam line may disrupt flow dynamics within the pilot chamber. Moreover, a seam between segments of a multi-segment structure may form a structural weak point under certain conditions and/or additional material (e.g., weld spatter) may be solidified within the pilot chamber beyond the intended joint line.

Figure 4:
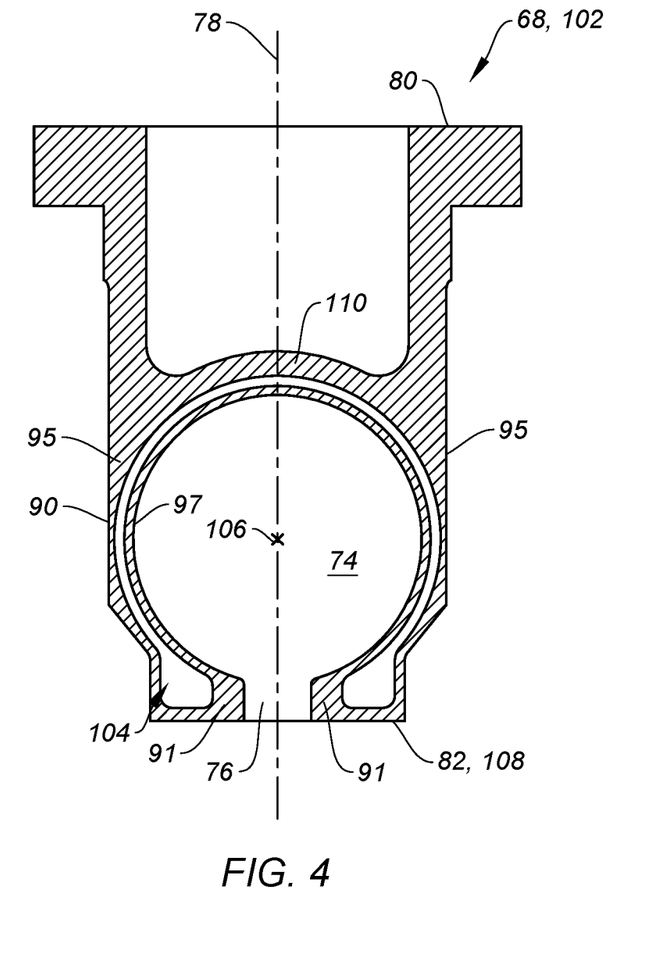
FIGS. 4-8 are sectional illustrations of the pilot chamber structure with various arrangements.
Figure 5:
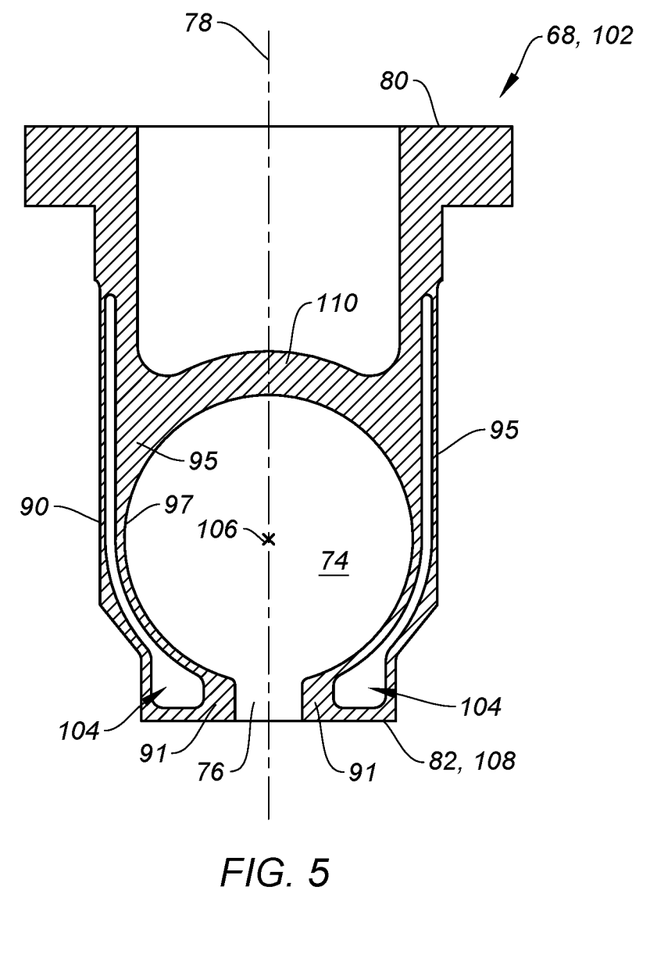

In some embodiments, referring to FIGS. 4 and 5, the pilot chamber structure 68 may be configured with an internal cavity 104. This internal cavity 104 may extend circumferentially about the pilot chamber 74 and/or the pilot aperture 76 to provide a thermal buffer thereabout. The internal cavity 104, for example, may extend circumferentially about (e.g., partially or completely around) the structure centerline 78 and/or a reference line 106 perpendicular to the structure centerline 78 (e.g., extending out of a plane of FIG. 4, 5). The internal cavity 104 of FIGS. 4 and 5 is disposed in the structure sidewall 95 between the base interior surface 97 and the base exterior surface 90. The internal cavity 104 of FIGS. 4 and 5 is disposed in the structure endwall 91 between the base interior surface 97 and a distal end surface 108 of the pilot chamber structure 68 at the structure inner end 82. Referring to FIG. 4, the internal cavity 104 may extend laterally across the pilot chamber structure 68 through a backwall 110 of the pilot chamber structure 68 adjacent the pilot chamber 74. Alternatively, referring to FIG. 5, an (e.g., arcuate or annular) end of the internal cavity 104 may extend longitudinally along the structure centerline 78 in a direction away from the pilot chamber 74 and the pilot aperture 76 towards the structure outer end 80. While the internal cavity 104 is shown in FIGS. 4 and 5 as an air cavity, it is contemplated the internal cavity 104 may alternatively be partially or completely filled with a thermal barrier material; e.g., a refractory metal.

Figure 6:
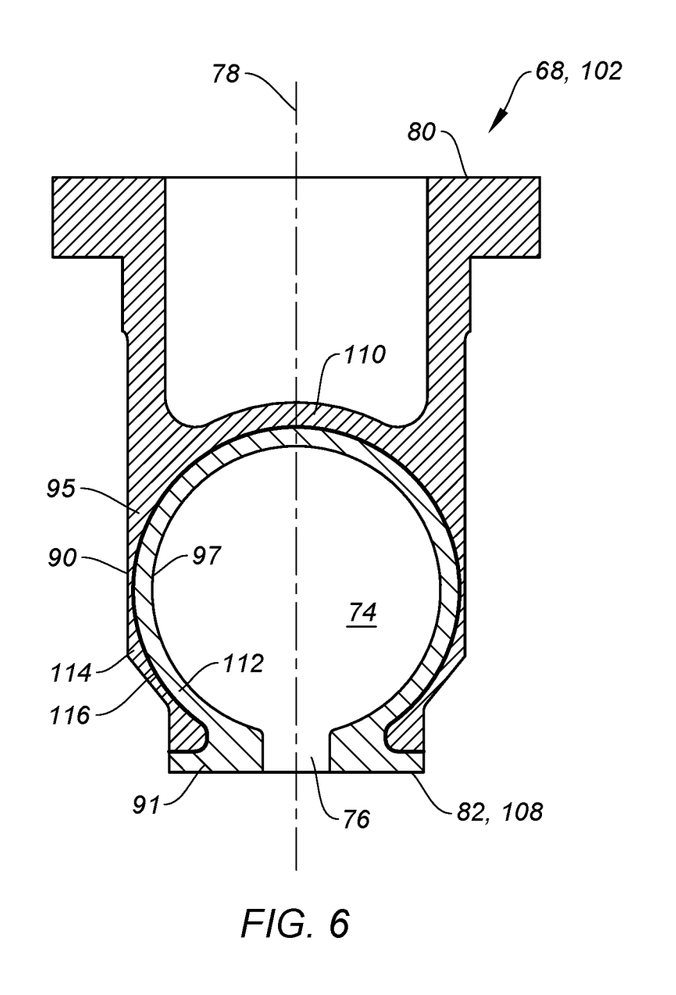
Figure 7:
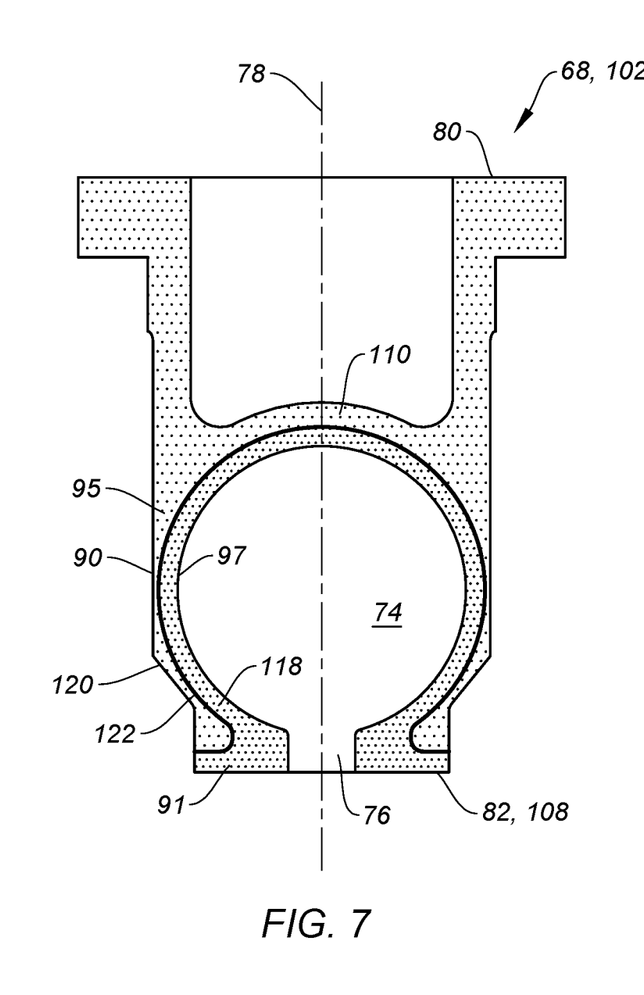

In some embodiments, referring to FIGS. 6 and 7, one or more material properties of the pilot chamber structure 68 and its monolithic body 102 may change (e.g., may continuously or incrementally vary) as the pilot chamber structure 68 projects out/away from the base interior surface 97; e.g., laterally between base interior surface 97 and the base exterior surface 90. Examples of such material properties include, but are not limited to, a material makeup (e.g., a chemical composition) of the pilot chamber structure 68 and its monolithic body 102, and a material density of the pilot chamber structure 68 and its monolithic body 102.

Referring to FIG. 6, the pilot chamber structure 68 may be constructed from multiple materials. For example, an interior portion 112 of the pilot chamber structure 68 and its monolithic body 102 at least partially or completely forming the base interior surface 97 may be formed (e.g., only or substantially) from a first material. An exterior portion 114 of the pilot chamber structure 68 and its monolithic body 102 at least partially or completely forming the base exterior surface 90 may be formed (e.g., only or substantially) from a second material which is different than the first material. An optional intermediate portion 116 of the pilot chamber structure 68 and its monolithic body 102 between the interior portion 112 and the exterior portion 114 may be formed from a mixture (e.g., a gradient) of the first material and the second material. With such a construction, the first and the second materials may be selected based on their location within the pilot chamber structure 68. For example, the first material may be selected for increased temperature and/or oxidation resistance. The second material may be selected for increased fracture toughness and/or fatigue resistance. Here, the interior portion 112 may provide a shell around the pilot chamber 74.

In some embodiments, the first and the second materials may be the same type of material. For example, both the first and the second materials may be ceramics. In another example, both the first and the second materials may be metals; e.g., pure metals and/or alloys. However, a chemical composition of the first material (the first ceramic or the first metal) is different than a chemical composition of the second material (the second ceramic or the second metal). In other embodiments, the first and the second materials may be different types of material. For example, the first material may be a ceramic and the second material may be a metal, or vice versa. Moreover, while the pilot chamber structure 68 is described above as being constructed from two different materials—the first and the second materials and a blend thereof—it is contemplated the pilot chamber structure 68 may alternatively be constructed from three or more different materials.

Referring to FIG. 7, the pilot chamber structure 68 may be formed with multiple densities. For example, an interior portion 118 of the pilot chamber structure 68 and its monolithic body 102 at least partially or completely forming the base interior surface 97 may be formed with a first density. An exterior portion 120 of the pilot chamber structure 68 and its monolithic body 102 at least partially or completely forming the base exterior surface 90 may be formed with a second density which is different (e.g., more or less) than the first density. An optional intermediate portion 122 of the pilot chamber structure 68 and its monolithic body 102 may be formed to provide a density gradient between the first density of the interior portion 118 and the second density of the exterior portion 120. With such a construction, the first and the second densities may be selected based on their location within the pilot chamber structure 68. The change in density may be provided by changing materials as described above with respect to FIG. 6. The change in density may also or alternatively be provided using other techniques; e.g., different material deposition and/or material compaction techniques, heat treating, etc.

Figure 8:
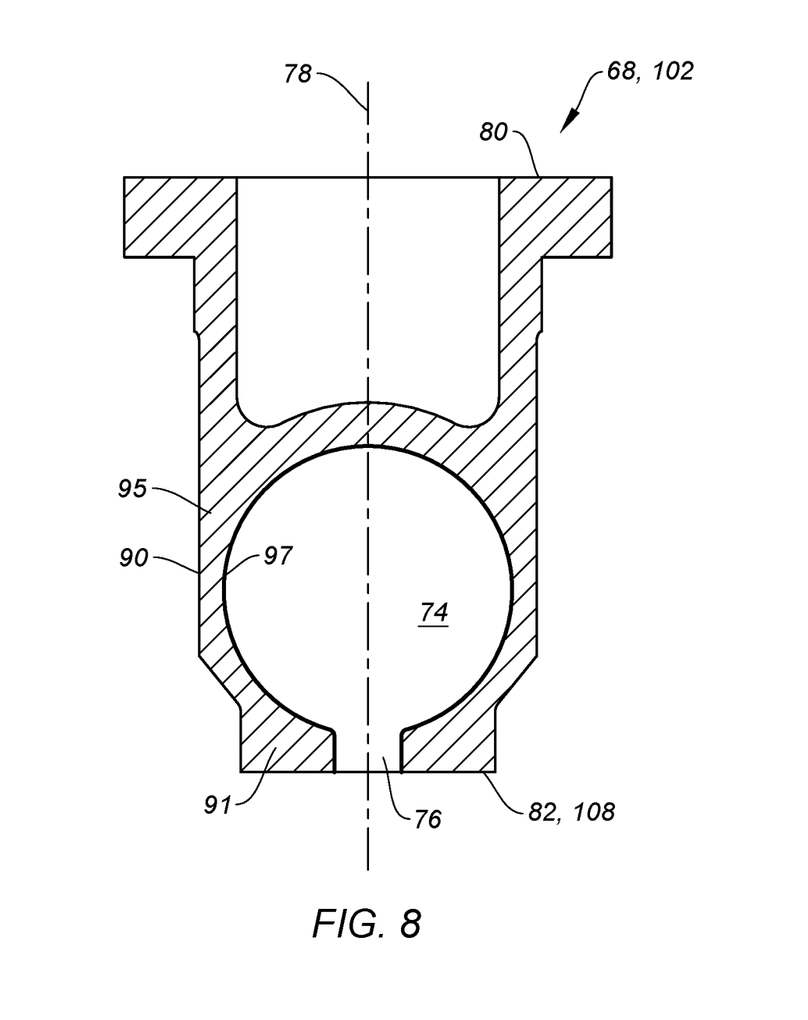

In some embodiments, referring to FIG. 8, surfaces of the pilot chamber structure 68 may be provided with different surface roughnesses by providing, for example, tailored surface texturing. A surface roughness of part or all of the base interior surface 97, for example, may be different (e.g., greater or less) than a surface roughness of part or all of the base exterior surface 90. By varying the surface roughness, flow dynamics and/or heat exchanger characteristics along that surface (e.g., 90, 97) may be tailored. For example, the surface roughness of the base interior surface 97 may be tailored (e.g., increased) to promote boundary layer turbulence within the pilot chamber 74 and/or cooling efficiency.

Figure 9:
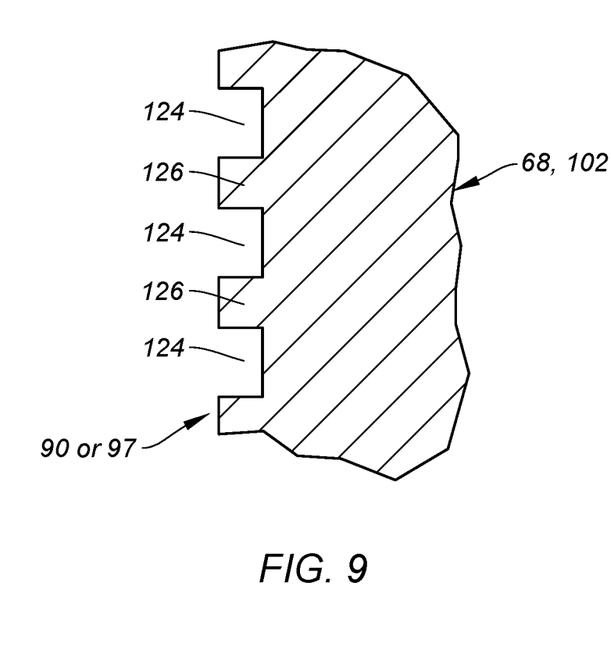
FIG. 9 is a sectional illustration of the pilot chamber structure along a grooved surface.

Referring to FIG. 9, one or more of the surfaces 90, 97 may also or alternatively be configured with one or more channels 124, ribs 126 and/or various other heat exchanger features. Here, each channel 124 projects into the pilot chamber structure 68 from the respective surface 90, 97.

Figure 10:
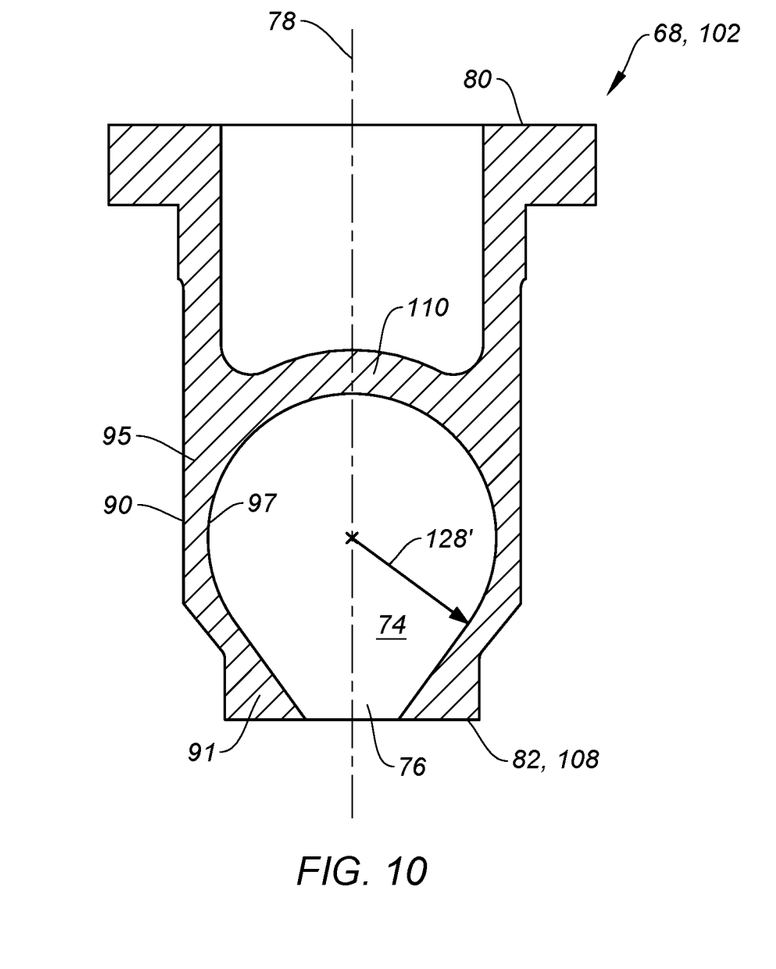
FIG. 10 is a sectional illustration of the pilot chamber structure with a non-spherical pilot chamber.

In some embodiments, referring to FIGS. 3-8, at least a portion or an entirety of the base interior surface 97 may be configured with a uniform (e.g., constant) radius of curvature 128 (see FIG. 3). For example, the base interior surface 97 and the pilot chamber 74 bounded thereby may be configured with spherical geometries. In other embodiments, referring to FIG. 10, at least a portion or an entirety of the base interior surface 97 may be configured with a non-uniform (e.g., variable, changing, etc.) radius of curvature 128'. For example, the base interior surface 97 and the pilot chamber 74 bounded thereby may be configured with teardrop-shaped geometries. In another example, the base interior surface 97 and the pilot chamber 74 bounded thereby may be configured with conical or frustoconical geometries. The present disclosure, however, is not limited to the foregoing exemplary arrangements.

As described above, the pilot chamber structure 68 may be constructed from a single material or multiple materials; e.g., metal(s) and/or ceramic(s). Examples of the metal include, but are not limited to, a nickel (Ni) alloy or a cobalt (Co) alloy, or the like. Examples of the ceramic include, but are not limited to, silicon carbide (SiC) or silicon nitride (SiN), or the like. The present disclosure, however, is not limited to the foregoing exemplary materials.

In some embodiments, referring to FIG. 3, the pilot chamber structure 68 may be configured for installation with and/or removal from the IC engine 26 and its engine housing 34 (e.g., completely) from an exterior of the IC engine 26 and its engine housing 34. Thus, assembly and/or maintenance personnel may not need access to an interior of the IC engine 26 and its engine housing 34 for pilot chamber structure installation, inspection and/or removal. Removing the pilot chamber structure 68 may also facilitate inspection of one or more elements internal to the IC engine 26; e.g., the rotor seal 62 of FIG. 2, the interior 64 of the housing peripheral wall 50 of FIG. 2, the rotor faces 58 of FIG. 2, etc. This may simplify engine assembly, inspection and/or maintenance.

The ignition system 40 is described above with reference to the rotary engine; e.g., the Wankel engine. It is contemplated, however, the ignition system 40 may alternatively be configured with various other types of engines such as a reciprocating piston engine or a gas turbine engine. The present disclosure therefore is not limited to any particular engine types or configurations.

In some embodiments, the pilot chamber structure 68 may be formed using additively manufacturing; e.g., 3D printing. For example, a monolithic green structure (e.g., a green part preform of the pilot chamber structure 68) may be built up in a layer-by-layer fashion. Here, the term "green" may describe a structure formed by a mass of (e.g., densely packed) powder embedded within and held together by a solidified binder. This structure may (or may not) also include reinforcement material (e.g., particles, fibers, etc.) intermixed with the powder and embedded in the solidified binder, which reinforcement material may (or may not) be composed of a different material than the powder. Examples of the powder include, but are not limited to, metal powder and/or ceramic powder. Examples of the binder include, but are not limited to, wax, ethylene vinyl acetate (EVA), epoxy, polyethylene and polypropylene. Examples of the reinforcement material include, but are not limited to, carbon fiber whiskers, SiC particulates and/or oxide particles. The term "preform" may describe a structure which shares a substantially common (e.g., the same) configuration with the structure to be formed. The green structure, for example, may have the same geometry, features, etc. as the pilot chamber structure 68. However, the green structure may be slightly bigger than the pilot chamber structure 68 where shrinkage is expected during the formation process (e.g., final sintering process). Examples of suitable additive manufacturing techniques include, but are not limited to, binder jetting, stereolithography, fused deposition modeling (FDM), metal extrusion (MEX), and bound deposition molding (BDM).

Following the additive manufacturing of the green structure, the green structure may be debound to partially or substantially remove the binder. For example, during thermal debinding, the green structure may be imbedded in a compacted powder bed of another material and heated in a protective atmosphere to extract the binder while maintaining (e.g., keeping) an overall shape of the structure. Other examples of debinding include, but are not limited to, solvent debinding and catalytic debinding (e.g., using a vapor of a solvent to remove the binder). The debinding produces a brown structure; e.g., a brown part preform of the pilot chamber structure 68. Here, the term "brown" may describe a porous and/or friable structure substantially formed by the mass of the powder (and the reinforcement material when included). While the brown structure is substantially devoid of the binder, it is contemplated a residual amount of the binder may be retained to help hold the brown structure together prior to sintering. The brown structure may then be sintered to form the pilot chamber structure 68. Of course, one or more additional processes may also be performed to strengthen and/or finish the pilot chamber structure 68. One or more features of the pilot chamber structure 68 may be machined, the sintered material may be impregnated and/or infiltrated with another material, one or more surfaces of the pilot chamber structure 68 may be coated, the pilot chamber structure 68 may be heat treated, or the like. The present disclosure, however, is not limited to the foregoing exemplary processes. For example, the additive manufacturing may alternatively be performed using a technique which does not require debinding, etc.

Figure 11A:
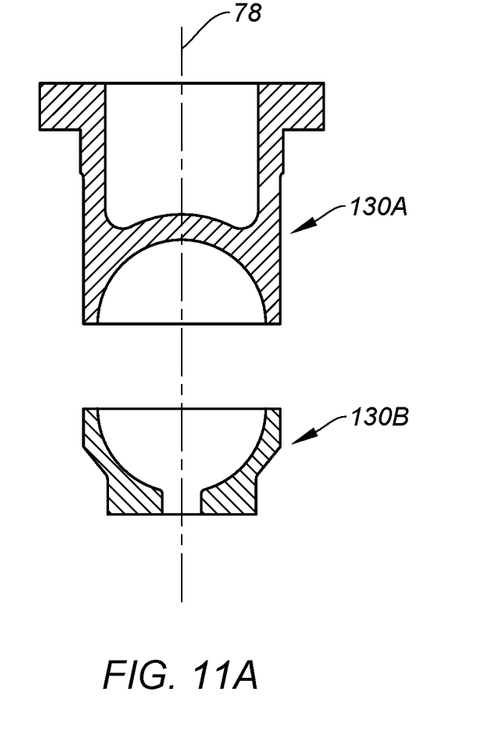
FIGS. 11A-C are sectional illustrations depicting select steps of a method for powder injection molding the pilot chamber structure.
Figure 11B:
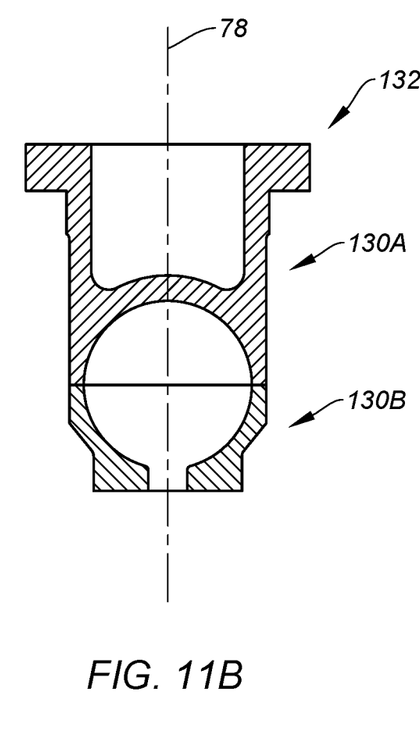
Figure 11C:
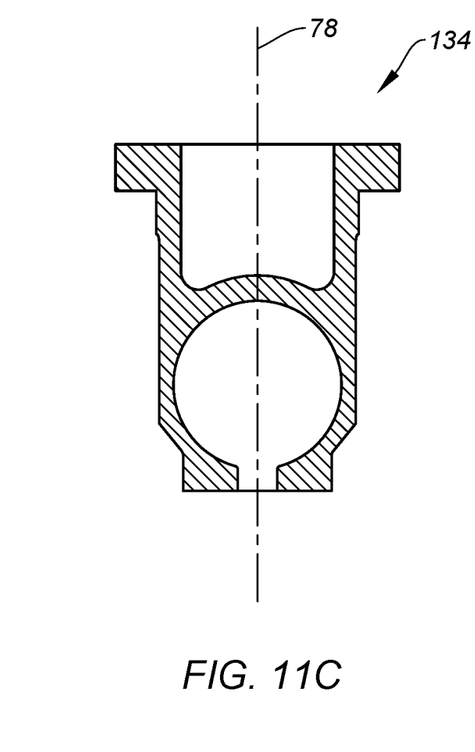

In some embodiments, the pilot chamber structure 68 may be formed using powder injection molding (PIM). For example, referring to FIG. 11A, multiple green components 130A and 130B (generally referred to as "130") may be formed using the powder injection molding. Each of these green components 130 may be a green component preform of a respective section of the pilot chamber structure 68. Similar to the green structure described above, each green component 130 includes a mass of the powder (and optionally the reinforcement material) embedded within and held together by the solidified binder. Referring to FIG. 11B, the green components 130 are arranged together in intimate contact (with or without a linkage between the green components 130) to form a green structure 132/a green assembly. Referring to FIG. 11C, the green structure 132 is then co-debound to provide a monolithic brown structure 134. During this co-debinding, the interconnected green structure 132 may be placed under shape retaining conditions, and the binder may be melted to form a seamless monolithic green structure. This seamless monolithic green structure is then debound to substantially remove the binder and provide the brown structure 134. Another example of the co-debinding is discloses in U.S. Pat. No. 10,226,818, which is hereby incorporated herein by reference in its entirety. The brown structure 134 may then be sintered to form the pilot chamber structure 68; e.g., see FIGS. 3-8 and 10. Of course, one or more additional processes may also be performed to strengthen and/or finish the pilot chamber structure 68. One or more features of the pilot chamber structure 68 may be machined, the sintered material may be impregnated and/or infiltrated with another material, one or more surfaces of the pilot chamber structure 68 may be coated, the pilot chamber structure 68 may be heat treated, or the like.

Figure 12A:
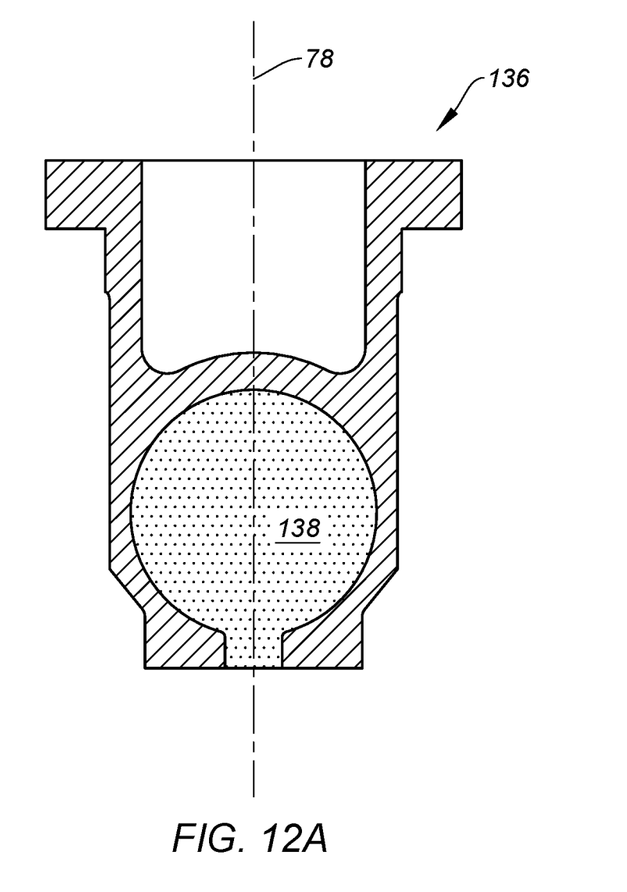
FIGS. 12A and 12B are sectional illustrations depicting select steps of another method for powder injection molding the pilot chamber structure.
Figure 12B:
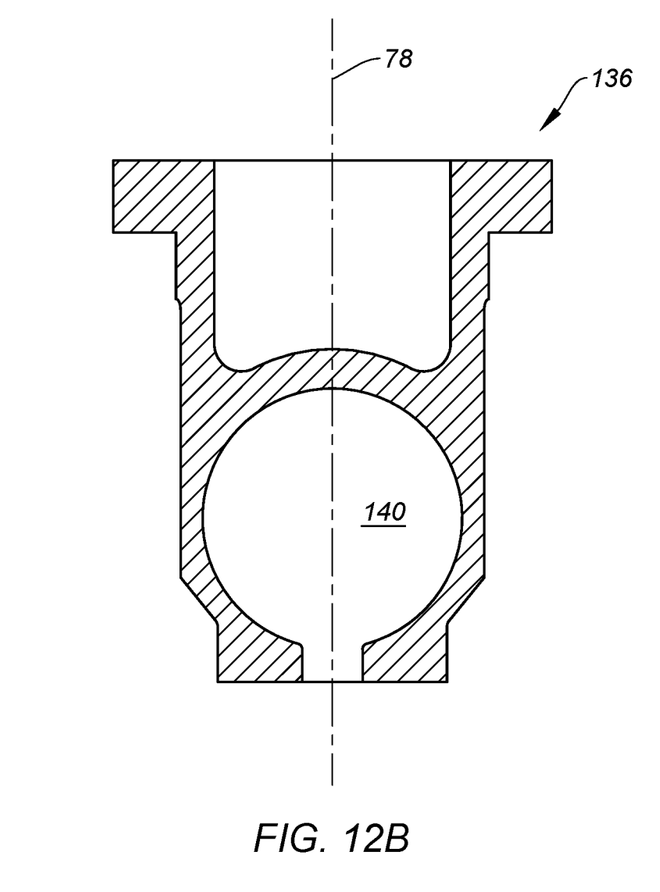

In some embodiments, referring to FIG. 12A, the powder injection molding may alternatively be performed to form a monolithic green structure 136 (e.g., the green part preform of the pilot chamber structure 68) rather than multiple green components 130 as described above. A preform of the pilot chamber 74 may be formed within the green structure 136 utilizing a soluble core 138. Referring to FIG. 12B, following the formation of the green structure 136, the soluble core 138 may be removed to leave behind an empty cavity 140—the preform of the pilot chamber 74. The soluble core 138 may be removed using a hot bath, induction heating and/or various other techniques. The green structure 136 may subsequently be processed as described above (e.g., de-bound and sintered) to form the pilot chamber structure 68.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An apparatus for a powerplant, comprising:
a pilot chamber structure formed as a monolithic body, the pilot chamber structure including an exterior surface, an interior surface, a pilot chamber, a pilot aperture, a fuel aperture and an ignitor aperture, and a material property of the monolithic body changing as the pilot chamber structure extends between the exterior surface and the interior surface;
the interior surface forming an outer peripheral boundary of the pilot chamber;
the pilot chamber internal to the pilot chamber structure;
the pilot aperture projecting into the pilot chamber structure to the pilot chamber;
the fuel aperture projecting into the pilot chamber structure to the pilot chamber; and
the ignitor aperture projecting into the pilot chamber structure to the pilot chamber.

2. The apparatus of claim 1, wherein a surface texture of the interior surface is different than a surface texture of the exterior surface.

3. The apparatus of claim 1, wherein a channel projects into the pilot chamber structure from the interior surface.

4. The apparatus of claim 1, wherein
the pilot chamber structure further includes an internal air cavity between the interior surface and the exterior surface; and
the internal air cavity extends circumferentially about the pilot chamber.

5. The apparatus of claim 1, wherein at least a portion of the interior surface has a uniform radius of curvature.

6. The apparatus of claim 1, wherein at least a portion of the interior surface has a non-uniform radius of curvature.

7. The apparatus of claim 1, wherein the monolithic body comprises a ceramic.

8. The apparatus of claim 1, wherein the monolithic body comprises a metal.

9. The apparatus of claim 1, further comprising:
a housing forming a combustion volume within the housing;
a primary fuel injector configured to inject primary fuel into the combustion volume; and
an ignition system configured to ignite the primary fuel within the combustion volume, the ignition system including a pilot fuel injector, a pilot ignitor and the pilot chamber structure;
the pilot fuel injector mated with the fuel aperture and configured to inject pilot fuel into the pilot chamber;
the pilot ignitor mated with the ignitor aperture and configured to ignite the pilot fuel within the pilot chamber; and
the pilot chamber fluidly coupled with the combustion volume through the pilot aperture.

10. The apparatus of claim 1, wherein the material property comprises a density of the monolithic body.

11. The apparatus of claim 10, wherein an interior portion of the monolithic body at least partially forming the interior surface has a higher density than an exterior portion of the monolithic body at least partially forming the exterior surface.

12. The apparatus of claim 10, wherein an interior portion of the monolithic body at least partially forming the interior surface has a lower density than an exterior portion of the monolithic body at least partially forming the exterior surface.

13. The apparatus of claim 1, wherein the material property comprises a material composition of the monolithic body.

14. The apparatus of claim 13, wherein
an interior portion of the monolithic body at least partially forming the interior surface comprises a first material; and
an exterior portion of the monolithic body at least partially forming the exterior surface comprises a second material which is different than the first material.

15. The apparatus of claim 14, wherein an intermediate portion of the monolithic body between the interior portion of the monolithic body and the exterior portion of the monolithic body comprises the first material and the second material.

16. An apparatus for a powerplant, comprising:
a pilot chamber structure formed as a monolithic body, the pilot chamber structure including an exterior surface, an interior surface, a pilot chamber, a pilot aperture, a fuel aperture and an ignitor aperture;
the interior surface forming an outer peripheral boundary of the pilot chamber, and a surface texture of the interior surface different than a surface texture of the exterior surface;
at least one channel projecting into a portion of the pilot chamber structure from the interior surface;
the pilot chamber internal to the pilot chamber structure;
the pilot aperture projecting into the pilot chamber structure to the pilot chamber;
the fuel aperture projecting into the pilot chamber structure to the pilot chamber; and
the ignitor aperture projecting into the pilot chamber structure to the pilot chamber.

17. The apparatus of claim 16, wherein the interior surface includes at least one rib.

18. An apparatus for a powerplant, comprising:

a pilot chamber structure formed as a monolithic body, the pilot chamber structure including an exterior surface, an interior surface, a pilot chamber, a pilot aperture, a fuel aperture and an ignitor aperture, and a density of the monolithic body changing as the pilot chamber structure extends between the exterior surface and the interior surface;

the interior surface forming an outer peripheral boundary of the pilot chamber;

the pilot chamber internal to the pilot chamber structure;

the pilot aperture projecting into the pilot chamber structure to the pilot chamber;

the fuel aperture projecting into the pilot chamber structure to the pilot chamber; and the ignitor aperture projecting into the pilot chamber structure to the pilot chamber.

* * * * *